INTERLOCKING OPERATING MECHANISM

Original Filed May 17, 1962

Inventors,
Uriel F. Carter
Arthur F. Kolb
By H. R. Rather
Attorney

United States Patent Office

Re. 26,113
Reissued Nov. 8, 1966

26,113

INTERLOCKING OPERATING MECHANISM

Uriel F. Carter, Wauwatosa, and Arthur F. Kolb, Mequon, Wis., assignors to Cutler-Hammer, Inc., Milwaukee, Wis., a corporation of Delaware Original No. 3,196,227, dated July 20, 1965, Ser. No. 195,571, May 17, 1962. Application for reissue Mar. 3, 1966, Ser. No. 534,285
12 Claims. (Cl. 200—50)

Matter enclosed in heavy brackets [ ] appears in the original patent but forms no part of this reissue specification; matter printed in italics indicates the additions made by reissue.

This invention relates to mechanical linkage devices designed to alternately operate two mechanical devices. More particulary this invention relates to interlocking mechanisms to alternately actuate two toggle operated electrical switches.

It is an object of the invention to provide an interlocking mechanism of economical construction to alternately operate two separate mechanical devices.

A more specific object of the invention is to provide an interlocking rotary operator to alternately actuate two lever or toggle operated motor starters.

A further specific object of the invention is to provide a knob operated interlocking operating mechanism for two manually actuated circuit breakers, one of which has overload protection suitable for a high motor speed and the other has overload protection suitable for a low motor speed.

Other objects and advantages of the invention will hereinafter appear.

While the device hereinafter described is effectively adapted to fulfill the objects stated, it is to be understood that we do not intend to confine our invention to the particular preferred embodiment of operator or switch disclosed since it is susceptible of various modifications without departing from the scope of the appended claims.

Figure 1:
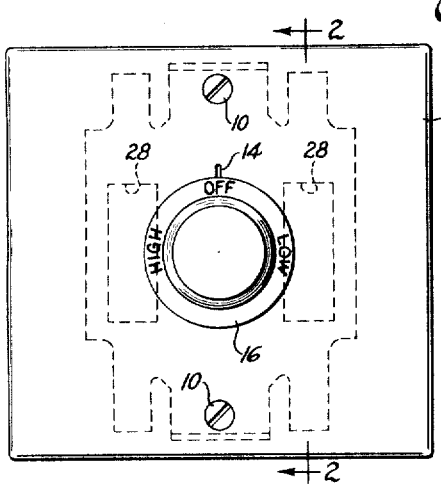
FIGURE 1 is a front view of a two speed manual operated electric motor starter embodying the present invention.

The device illustrated in the drawings and described herein comprises an interlocking operator and two toggle operated motor starters or circuit breakers mounted within an enclosure and is adapted for use as a two speed motor starter. The interlocking operator can, of course, be employed in assemblies incorporating other types of switches or mechanical devices and is not limited in purpose to the control of motors.

The enclosure of the device comprises a rectangular box-like case 2 of sheet metal construction and a cover 4 fitting over the open front of case 2. Conduit knockouts (not shown) are provided in both the top and bottom of the case 2 for entry of electrical wiring. Two opposed pairs of mounting brackets 6 are welded to the interior surface of the case near the forward edges of the top and bottom. In the center of cover 4 there is an aperture through which passes the flattened end of operating shaft 8. Above and below this central aperture there are apertures to accommodate screws 10 which fasten cover 4 to mounting plate 12. A reference mark 14 is inscribed in the front surface of the cover 4. An operating knob 16 tightly engages the protruding flattened end of shaft 8. The words "high," "low" and "off" inscribed near the periphery of rotatable knob 16 visually indicate the operating position of the interior mechanism, since in each of the three stable positions of the mechanism, the respective descriptive word becomes alined with the reference mark 14.

Figure 2:
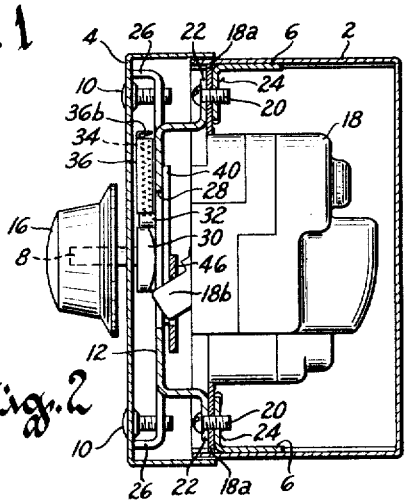
FIG. 2 is a sectional view taken on line 2—2 of FIG. 1.

Inside the enclosure there are mounted two toggle operated circuit breakers 18 equipped with thermal overload trip mechanisms, the construction and operation of which are shown and described in Kolb Patent No. 2,813,951. Each of these circuit breakers 18 has two mounting strips 18a (FIG. 2) and a toggle operating lever 18b having an "off" and "on" position. As the circuit breakers are oriented in the drawing, the upward position of operating lever 18b is the "on" position and the downward position is the "off" position. These circuit breakers 18 are attached, together with mounting plate 12, to mounting brackets 6 within the case 2 by screws 20 which pass through the slots within offset mounting tabs 22 of mounting plate 12, through apertures within mounting strips 18a of circuit breakers 18, and through mounting brackets 6 (FIG. 2). A speed nut 24 attached to bracket 6 fastens the inner end of screw 20.

The mounting plate 12 is generally rectangular with mounting tabs 22 projecting from the top and bottom. Two pair of oppositely positioned mounting tabs 22 are offset to the rear of the plane of the central portion of plate 12 and are used to fasten plate 12 and the attached operating mechanism to mounting brackets 6. Between tabs 22, there are two cover mounting brackets 26 having threaded apertures to accommodate screws 10 and having outer edges bent forwardly (FIG. 2) to hold cover 4 a proper distance from the operating mechanism. In the central portion of plate 12 there are two parallel rectangular apertures 28 to allow the movement of operating levers 18b. Shaft 8 passes through and is journaled within a round aperture in the center of plate 12.

A square cam member 30 with slightly rounded corners is formed on shaft 8 immediately forward of plate 12. A substantially U-shaped cam follower 32 cooperates with cam 30 and is biased into engagement therewith by compression spring 34 which is positioned between the upwardly pointing legs of U-shaped cam follower 32. Cam follower 32 slides vertically within a generally rectangular space between plate 12 and follower guiding channel 36, the edge portions 36a of which are welded to plate 12. The upper end of spring 34 is retained by a small spring retainer tab 36b formed in the upper surface of channel 36. The cam 30 and follower 32 furnish yieldable position indexing means for shaft 8 and provide the proper tactile "feel" to the mechanism.

Figure 4:
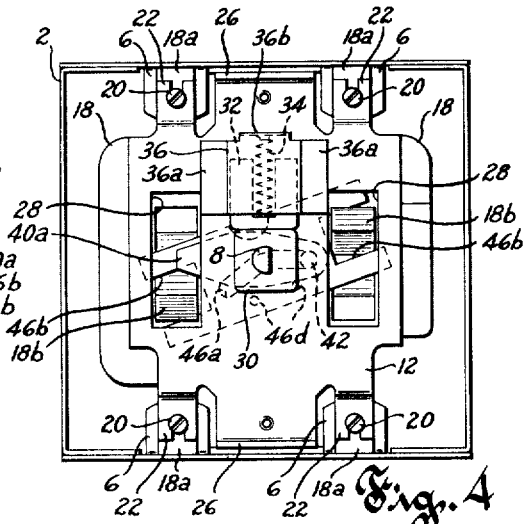
FIG. 4 is a view similar to FIG. 3 but with the operating mechanism rotated to its opposite position.
Figure 5:
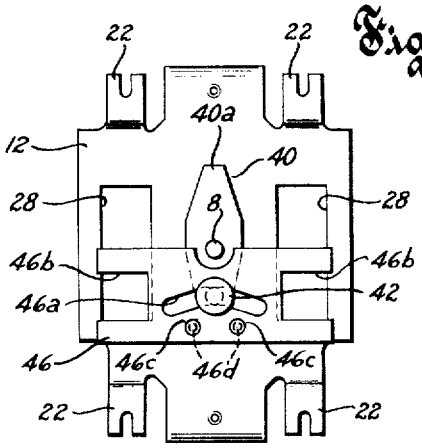
FIG. 5 is a rear view of the interlocking and operating mechanism in its intermediate "off" position and removed from the starter assembly.

Behind plate 12, there is a flat combination crank and interlock lever 40 non-rotatably attached at its center to the end of shaft 8 (FIG. 5). Lever 40 has a truncated tapered end [and 40a] *40a and* a rounded opposite end at which there is welded a rearward facing headed pin 42. This headed pin or crank pin 42 passes through and slides within slot 46a in the flat drive lever 46 which is directly behind crank-interlock lever 40. The head of crank pin 42 serves to retain drive lever 46 on pin 42 by engaging the rear surface of drive lever 46. At each end of drive lever 46, there are formed rectangular notches 46b to loosely fit over and engage the operating levers 18b of circuit breakers 18. A semi-circular recess is formed in the upper edge of drive lever to facilitate the welding of crank interlock lever 40 to shaft 8. Two indentations 46c (FIG. 3) on the rear side of lever 46 are the result of a process in which two small extruded projections 46d (FIGS. 3 and 4) are formed directly oppositely on the front surface of drive lever 46. These projections 46d serve as stops in conjunction with crank interlock 40. Their function will be more fully explained later.

The operation of mechanism will now be explained. The directions used in the following explanation, unless otherwise indicated, have reference to the mechanism as shown in the front views of FIGS. 1, 3 and 4.

With both circuit breakers 18 turned "off," both operating levers assume the lower "off" position and the mechanism appears as illustrated in FIGS. 1, 2 and 5. The operating knob 16 is oriented so that the word "off" on the peripheral flange of knob 16 is alined with index mark 14. The pressure of cam follower 32 on the edge of cam 30 serves to properly aline knob 16 and yieldably restrain knob 16 and shaft 8 from undesired rotation. In the "off" condition, the drive lever 46 extends horizontally, as shown in the rear view of FIG. 5, between the two depressed operating levers 18b. The crank interlock lever 40 assumes a vertical position (FIG. 5) and crank pin 42 is positioned intermediately in slot 46a of drive lever 46.

Switching to either the "high" or "low" positions is accomplished by rotation of operating knob 16. In the configuration illustrated, activation of the left circuit breaker 18 is intended to cause a high motor speed and is equipped with thermal overload protection suitable for high motor speeds. The right circuit breaker is a similar device but is equipped for low motor speeds. To switch to high speed condition shown in FIG. 3, knob 16 is rotated clockwise causing crank interlock lever 40 to be similarly rotated. Crank pin 42 at the lower end of lever 40 moves leftward in slot 46a and clockwise through a 90° arc about shaft 8. Drive lever 46 is restrained from horizontal movement by operating levers 18. As crank pin 42 moves upwardly, it exerts a force on the upper edge of slot 46a of drive lever 46. Since the notched ends of drive lever 46 engage operating levers 18b, an upward force is exerted against each of the operating levers 18b. But a greater force is exerted upon the left operating lever during the clockwise movement to the "high" position because the distance from headed pin 42 to the left operating lever is less than the distance to the right operating lever 18b. Consequently the left or high speed circuit breaker is actuated. The right end of drive lever 46 may move upwardly to some extent during this process depending upon the force required to move the operating lever of the right circuit breaker, but it does not move far enough to effect actuation of the snap action mechanism of the right circuit breaker. Upon actuation of the left circuit breaker, the consequent release of the force against the left end of drive lever 46 removes pressure of lever 46 against the right operating lever and allows the right lever to return to its original "off" position. It may be said, therefore, that the right end of lever 46 remains substantially at rest during the movement of the left end of lever 46 which causes actuation of the left circuit breaker. Furthermore, the tapered end 40a of crank interlock lever 40 is, at the same time, rotated in a clockwise direction to engage the upper surface of the right operating lever 18b to provide further protection against simultaneous actuation of both circuit breakers 18.

Figure 3:
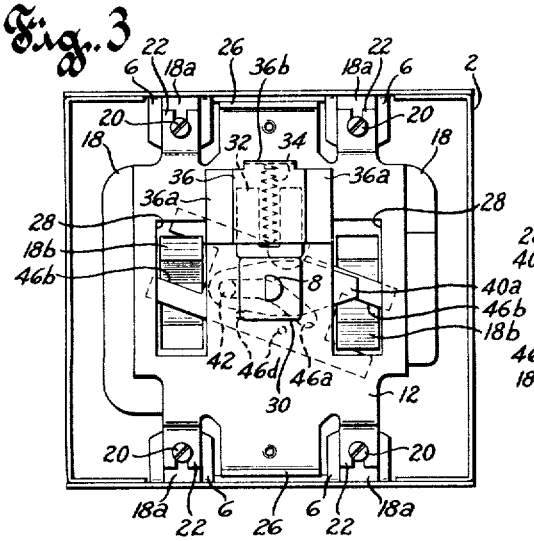
FIG. 3 is a front view with the cover of the starter removed.

During the 90° rotation to the "high" position shown in FIG. 3, cam 30 forces cam follower 32 upwardly, and when the "high" position is assumed, cam 32 is biased downwardly by spring 34 to engage another of the flat sides of cam 30 and thereby yieldably index the rotating members in the "high" position. Further clockwise rotation is prevented primarily by the contact of the tapered interlock end 40a of lever 40 with the right operating lever 18b, and secondly by the contact of the left projection 46d on drive lever 46 against the lower edge of crank lever 40.

To turn the left circuit breaker "off," the knob 16 is rotated counterclockwise 90° to its original position, returning the mechanism to its original condition. This movement forces crank pin 42 downwardly against the lower edge of slot 46a. Lever 46 is thereby returned to its original horizontal position and the left operating lever is returned to its "off" position. Since the right lever 18b is already in its downward position, there is no effect on the right or low speed circuit breaker.

The low speed circuit breaker may be similarly actuated by counterclockwise rotation of knob 16 until the word "low" on knob 16 becomes alined with index mark 14. Crank pin 42 then moves to the right side of slot 46a forcing the right side of drive lever 46 upwardly. The tapered end 40a of crank interlock lever 40 simultaneously moves in a counterclockwise direction to contact the left operating lever 18b. The right operating lever 18b is forced upwardly and the right or low speed circuit breaker is actuated. The right projection 46d on drive lever 46 contacts the lower edge of crank lever 40 to limit rotation and cam follower 32 engages a third of the sides of cam 30. The mechanism then appears in the "low speed" condition as illustrated in FIG. 4. A 90° rotation of knob 16 will reverse the process and return the mechanism to its original position and turn "off" the low speed circuit breaker.

The circuit breakers 18 are of the "trip-free" thermal overload type which, following tripping, may be reset after the overload mechanism has cooled by movement of the operating lever 18b from the "on" position to the "off" position. It can be seen that this operation of resetting either of these circuit breakers when used with the illustrated interlock and operating assembly may be performed by rotation of knob 16 to the "off" position.

We claim:

1. In an electrical control device:

(a) a first electrical switch having a first operating member extending therefrom;

(b) a second electrical switch having a second operating member extending therefrom;

(c) a drive member engaging said first operating member and said second operating member;

(d) a rotary operating member having first and second actuating positions and an intermediate position;

(e) means connecting said rotary member to said drive member to actuate said first electrical switch when said rotary member is rotated in a first direction from said intermediate position and for actuating said second electrical switch when said rotary member is rotated in a second direction from said intermediate position whereby said first and second electrical switches are alternately and individually actuated;

(f) interlocking means separate from said drive member and driven by said rotary member when a switch is actuated for blocking the movement of the operating member of the other of the switches whereby simultaneous actuation of said first and second switches is prevented.

2. The invention as defined in claim 1 together with:
(a) a cam on said rotary member; and
(b) a cam follower biased into engagement with said cam;
(c) the cooperation of said cam and cam follower serving to index said rotary member.

3. In an operating mechanism for a pair of two position devices having toggle operators in combination:
(a) a base member;
(b) an operating shaft rotatably journaled in said member and having an intermediate position and two rotary spaced operating positions on opposite sides of said intermediate position;
(c) a drive member engageable adjacent its opposite ends with said toggle operators;
(d) driving connections between said shaft and said drive member slidably engaging said drive member;
(e) said driving connections, when said shaft is in said intermediate position, holding both ends of said drive member in a position wherein both of said toggle operators are both in the first of their two positions;
(f) and said driving connections, when said shaft is rotated to its other operating position, sliding toward one end of said drive member and shifting said one end of said drive member while the other end remains substantially at rest and vice versa.

4. The combination according to claim 3 together with another member extending from said shaft and rotating in correspondence with said shaft toward whichever end of said drive member is substantially unmoved when said shaft is operated to either of its said other operating positions to hold the operator of the device associated with such end of said drive member against movement from the position it is then in.

5. The combination according to claim 3 wherein said drive member is notched at each end to straddle the operators of said devices.

6. The combination according to claim 3 wherein said driving connections comprise a slot in said drive member and a crank fixed to said shaft and having a pin in said slot.

7. In an operating mechanism for a first mechanical device having a first operating means extending therefrom and a second mechanical device having a second operating means extending therefrom;
(a) drive means to extend between and operably engage said first and second operating means;
(b) a crank member rotatably journaled at a position between said first and second mechanical devices;
(c) means on said crank member serving to transmit force to said drive means between the portions of said drive means which engage said first and second operating means;
(d) said means on said crank member being disposed to move, consequent to rotation of said crank member in a first direction, from an intermediate position between said first and second operating means toward a first end of said drive [member] *means* to a first actuating position and move with a component of motion transverse with respect to a line between said first and second operating means to actuate said first end of said drive means while the second end of said [crank] *drive* means remains substantially at rest, and said means on said crank member being disposed to move, consequent to rotation of said crank member in a second direction, from said first actuating position to said intermediate position to reverse the movement of said drive means and return said drive means to its original position;
(e) said means on said crank [means] *member* further being movable, consequent to rotation of said crank member in a second direction, from said position intermediate said first and second operating means toward a second end of said drive means to a second actuating position and move with a component of movement transverse with respect to a line between said operating [member] *means* to actuate said second end of said drive means while said first end of said drive means remains substantially at rest, and said means on said crank member being disposed to move, consequent to rotation of said crank member in a first direction from said second actuating position to said intermediate position, to reverse the movement of said drive means and return said drive means to its original position;
(f) whereby said first mechanical device and said second mechanical device are alternately operated.

8. The invention as defined in claim 7 together with:
(a) interlocking means attached to said crank means and extending in a direction from the crank journal point opposite from said means on said crank member for transmitting force to said drive means, said interlocking means blocking the path of movement of said second operating means when said first operating means is actuated and blocking the path of movement of said first operating means when said second operating means is operated, whereby simultaneous operation of said first and second operating means is prevented.

9. The invention defined in claim 8, together with:
(a) a cam connected to said crank means; and
(b) a cam follower biased into engagement with said cam;
(c) the combination of said cam and said cam follower serving to index said crank means.

10. In an electrical control device:
(a) first and second electrical switches having toggle operators;
(b) supporting means with said first and second switches mounted thereon in side-by-side relation;
(c) a crank member journaled between said first and second switches;
(d) a drive lever extending between said first and second switches and the ends of which engage the respective toggle operators of said first and second switches;
(e) a slot in said drive lever extending generally longitudinally between said ends of said drive lever; and
(f) a crank pin on said crank member which slidably engages said slot in said drive lever;
(g) said crank pin being movable toward a first end of said drive lever upon rotation of said crank in a first direction from a center position to displace said first end of said drive lever laterally with respect to a line extending between the ends of said drive lever to actuate said first switch while the second end of said drive lever remains substantially at rest; and
(h) said crank pin further being movable toward said second end of said drive lever upon rotation of said crank lever in a second direction from said center position to displace said second end of said drive lever to actuate said second switch while said first end of said drive lever remains substantially at rest;
(i) whereby said first and second switches are alternately operated.

11. The invention as defined in claim 10, together with:
(a) an interlocking lever attached to said crank member and extending in a direction opposite said crank pin from the point at which said crank is journaled, said interlocking lever blocking the movement of the toggle operator of said second switch when said first switch is actuated and blocking the movement of the toggle operator of said first switch when said second switch is actuated;
(b) whereby simultaneous actuation of said first and second switches is prevented.

12. The invention as defined in claim 11, together with:
(a) a cam connected to said crank member; and
(b) a cam follower biased into engagement with said cam;
(c) the combination of said cam and cam follower serving to index said crank member in its operating positions.

References Cited by the Examiner

The following references, cited by the Examiner, are of record in the patented file of this patent or the original patent.

UNITED STATES PATENTS

| | | | |
|---|---|---|---|
| 1,805,375 | 5/1931 | Sampson | 74—483 |
| 2,158,657 | 5/1939 | Frank et al. | 200—50 |
| 2,961,501 | 11/1960 | Piteo | 200—50 |

ROBERT K. SCHAEFER, *Primary Examiner.*

BERNARD A. GILHEANY, *Examiner.*

M. GINSBURG, *Assistant Examiner.*